US008390753B2

United States Patent
Choi

(10) Patent No.: US 8,390,753 B2
(45) Date of Patent: Mar. 5, 2013

(54) THIN FILM TRANSISTOR ARRAY PANEL AND LIQUID CRYSTAL DISPLAY HAVING THE SAME

(75) Inventor: Sang-Gun Choi, Suwon-si (KR)

(73) Assignee: Samsung Display Co., Ltd. (KR)

( * ) Notice: Subject to any disclaimer, the term of this patent is extended or adjusted under 35 U.S.C. 154(b) by 890 days.

(21) Appl. No.: 12/497,018

(22) Filed: Jul. 2, 2009

(65) Prior Publication Data
US 2010/0007811 A1 Jan. 14, 2010

(30) Foreign Application Priority Data

Jul. 10, 2008 (KR) .................. 10-2008-0067148

(51) Int. Cl.
*G02F 1/1343* (2006.01)
*G02F 1/1368* (2006.01)

(52) U.S. Cl. ............ 349/43; 349/39; 349/106; 349/110; 349/139; 349/156

(58) Field of Classification Search .................... 349/38, 349/39, 42, 43, 106, 110, 111, 139, 156; 257/59, 72; 345/88, 92
See application file for complete search history.

(56) References Cited

U.S. PATENT DOCUMENTS

| 5,953,088 | A | * | 9/1999 | Hanazawa et al. | 349/110 |
| 5,959,706 | A | * | 9/1999 | Nagata et al. | 349/110 |
| 2002/0061367 | A1 | * | 5/2002 | Shohara et al. | 428/1.1 |
| 2006/0048473 | A1 | * | 3/2006 | Kim et al. | 52/506.05 |
| 2007/0070279 | A1 | * | 3/2007 | Sugiyama et al. | 349/139 |
| 2008/0001937 | A1 | * | 1/2008 | Shin et al. | 345/204 |

* cited by examiner

*Primary Examiner* — Dung Nguyen
*Assistant Examiner* — Tai Duong
(74) *Attorney, Agent, or Firm* — Innovation Counsel LLP

(57) ABSTRACT

A liquid crystal display according to an exemplary embodiment of the present invention includes a colored subsidiary light blocking member covering a space between first and second pixel electrodes. First and third shield electrodes are placed under a data line. The first and third shield electrodes are disposed parallel to the data line and across the data line from each other. A second shield electrode connects the bottom end of the first shield electrode with the top end of the third shield electrode at an angle of about 30 degrees to about 150 degrees. With this structure, light leakage at a gap between the pixel electrode and a possible short between the shield electrodes are prevented.

12 Claims, 7 Drawing Sheets

THIN FILM TRANSISTOR ARRAY PANEL AND LIQUID CRYSTAL DISPLAY HAVING THE SAME

CROSS-REFERENCE TO RELATED APPLICATION

This application claims priority to and the benefit of Korean Patent Application No. 10-2008-0067148 filed in the Korean Intellectual Property Office on Jul. 10, 2008, the entire content of which is incorporated herein by reference.

BACKGROUND (a) Technical Field

The present invention relates to a thin film transistor array panel and a display device having the same.

(b) Discussion of the Related Art

Liquid crystal displays are one of the widely used flat panel displays today. A liquid crystal display has two display panels on which field generating electrodes such as pixel electrodes and a common electrode are formed, and a liquid crystal layer that is interposed between the panels. In the liquid crystal display, voltages are applied to the field generating electrodes so as to generate an electric field over the liquid crystal layer, and the alignment of liquid crystal molecules of the liquid crystal layer is determined by the electric field. Accordingly, the polarization of incident light is controlled, thereby performing image display.

Liquid crystal displays with various structures have been developed to enhance their display quality, for example by increasing the aperture ratio, reducing RGB gamma distortions, preventing the leakage of light, etc.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a display device with first and second display panels, and a liquid crystal layer disposed between the first and second display panels. The first display panel includes a first substrate, and a light blocking member disposed on the first substrate. A plurality of color filters are disposed on the light blocking member, a plurality of pixel electrodes are disposed on the plurality of color filters, and a subsidiary light blocking member is disposed on the pixel electrodes such that it is placed at a region between two neighboring pixel electrodes. The second display panel includes a second substrate facing the first substrate, and a common electrode disposed on the second substrate.

The subsidiary light blocking member may have a width of about 6 μm to about 13 μm.

The subsidiary light blocking member may further include a column spacer.

The subsidiary light blocking member may have a thickness of less than about 2 μm.

The first display panel may further include a gate line disposed on the first substrate, and a storage electrode line disposed on the first substrate. A data line crosses the gate line and the storage electrode line while being insulated from the gate line and the storage electrode. The data line overlaps the light blocking member. A thin film transistor includes a gate electrode connected to the gate line, a source electrode connected to the data line, and a drain electrode connected to the pixel electrode. A storage electrode is connected to the storage electrode line such that it is overlapped with the drain electrode. A first shield electrode is connected to the storage electrode line, and disposed parallel to the data line. A third shield electrode is disposed parallel to the data line and across the data line from the first shield electrode. A second shield electrode connects the bottom end of the first shield electrode with the top end of the third shield electrode.

The second shield electrode may be connected to the first and third electrodes at an angle of about 30 degrees to about 150 degrees.

The length ratio of the first shield electrode to the third shield electrode may be about 1:2 to about 2:1.

The first to third shield electrodes may have a width of about 3 μm to about 4 μm, respectively.

The width of the second shield electrode may be smaller than the width of the first and third shield electrodes.

Another exemplary embodiment of the present invention provides a thin film transistor array panel having an insulation substrate, a gate line disposed on the insulation substrate with a gate electrode, and a storage electrode line disposed on the insulation substrate with a shield electrode. A gate insulating layer is disposed on the gate line and the storage electrode line, a semiconductor layer is disposed on the gate insulating layer, and a data line are disposed on the gate insulating layer. The data line includes a source electrode disposed on the semiconductor layer. A drain electrode is disposed on the semiconductor layer such that it is spaced apart from the source electrode thereon, a light blocking member is disposed on the data line and the drain electrode such that it covers the data line, and color filters are disposed on the light blocking member. A pixel electrode is disposed on the color filter such that it is connected to the drain electrode. The shield electrodes include a first shield electrode connected to the storage electrode line and disposed parallel to the data line, a third shield electrode placed across the data line from the first shield electrode, and a second shield electrode connecting the bottom end of the first shield electrode with the top end of the third shield electrode.

The storage electrode line may further include a storage electrode overlapping the drain electrode.

A subsidiary light blocking member may be disposed on the pixel electrodes, and overlapped with the data line.

The subsidiary light blocking member may further include a column spacer.

As there are no portions of the first and third shield electrodes facing each other, a possible short between the shield electrodes is prevented.

With the shield electrodes, the aperture ratio is heightened, while the RGB gamma distortions are reduced.

In the case that the first and third shield electrodes are similar in length to each other, couplings at the left and right sides of the pixel are maintained equally, and a waterfall effect as well as RGB gamma distortions are reduced.

When the light blocking member has a width of about 13 μm or less, the aperture ratio is increased, while the power consumption as well as the RGB gamma distortions are reduced.

Even when the light blocking member is misaligned be being horizontally moved left or right by about 3 μm or more, light leakage at the gap between the pixel electrodes is prevented because the colored subsidiary light blocking member covers that gap.

DETAILED DESCRIPTION OF THE EMBODIMENTS

Figure 1:
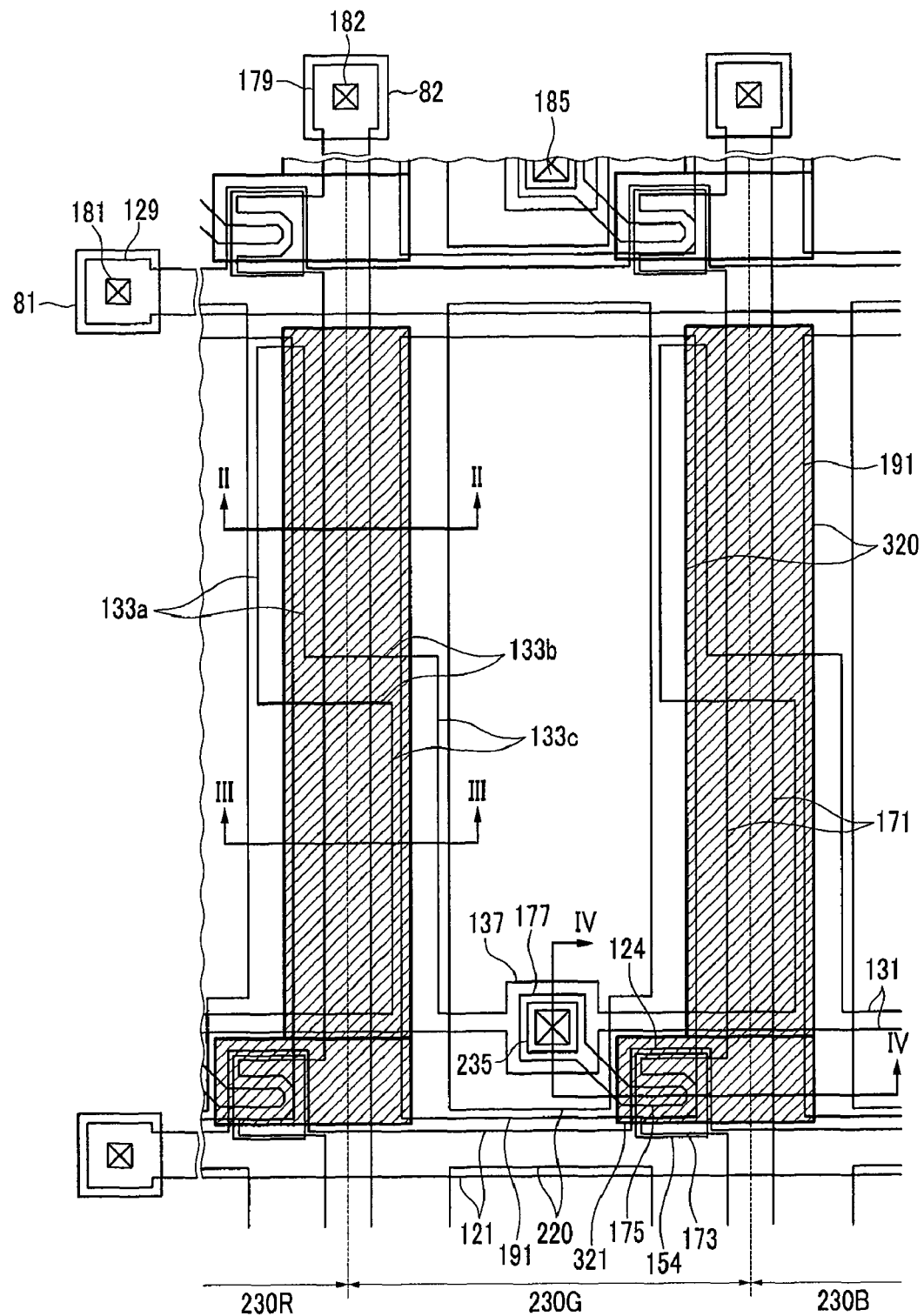
FIG. 1 is a layout view of a liquid crystal display according to an exemplary embodiment of the present invention.

The present invention will be described more fully hereinafter with reference to the accompanying drawings, in which exemplary embodiments of the present invention are shown. As those skilled in the art would realize, the described embodiments may be modified in various different ways, all without departing from the spirit or scope of the present invention. In the drawings, irrelevant portions are omitted to clearly describe the present invention, and like reference numerals designate like elements throughout the specification. Furthermore, detailed descriptions are not given to the well-known arts.

In the drawings, the thickness of layers, films, panels, regions, etc., are exaggerated for clarity. It will be understood that when an element such as a layer, film, region, or substrate is referred to as being "on" another element, it can be directly on the other element or intervening elements may also be present. In contrast, when an element is referred to as being "directly on" another element, there are no intervening elements present. It will be understood that when an element such as a layer, film, region, or substrate is referred to as being "under" another element, it can be directly under the other element or intervening elements may also be present. On the contrary, when an element is referred to as being "directly under" another element, there are no intervening elements present.

Now, a liquid crystal display according to an exemplary embodiment of the present invention will be described in detail with reference to FIG. 1 to FIG. 6.

Figure 2:
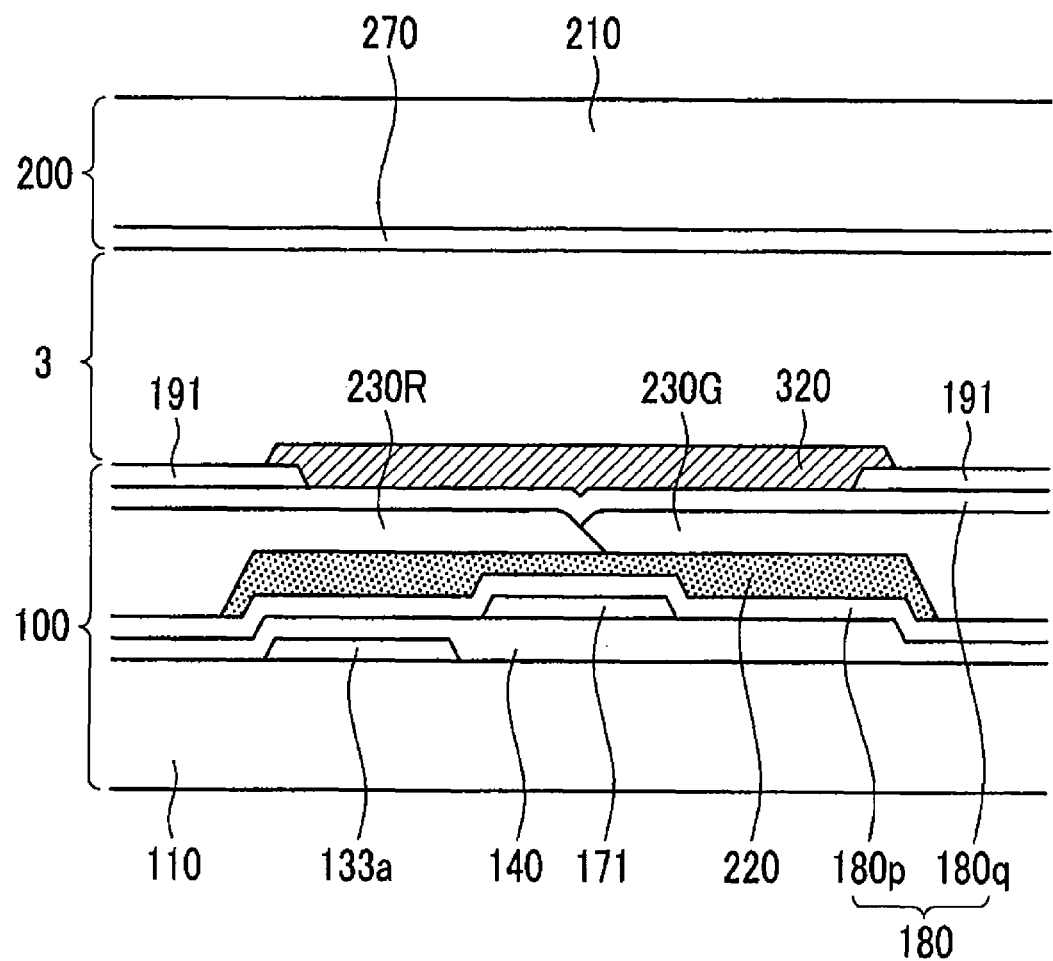
FIG. 2 is a cross-sectional view of the liquid crystal display shown in FIG. 1 taken along the II-II line thereof.
Figure 3:
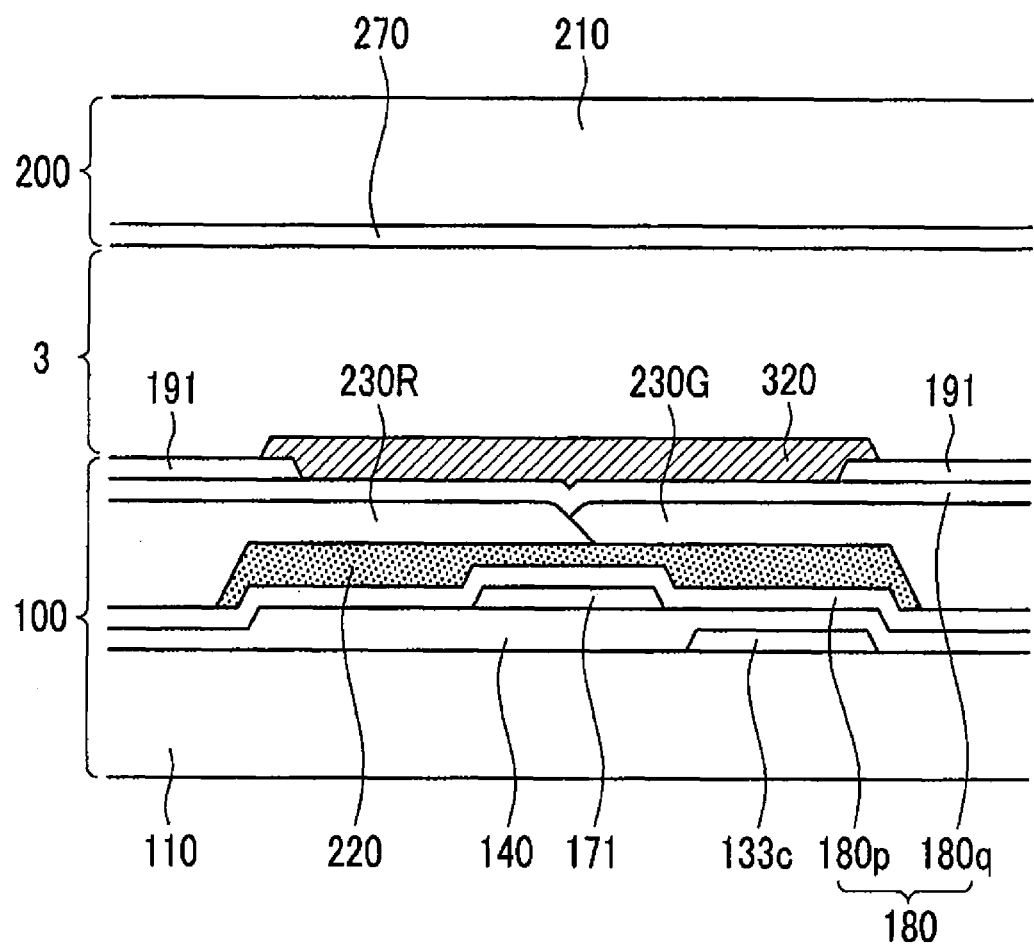
FIG. 3 is a cross-sectional view of the liquid crystal display shown in FIG. 1 taken along the III-III line thereof.
Figure 4:
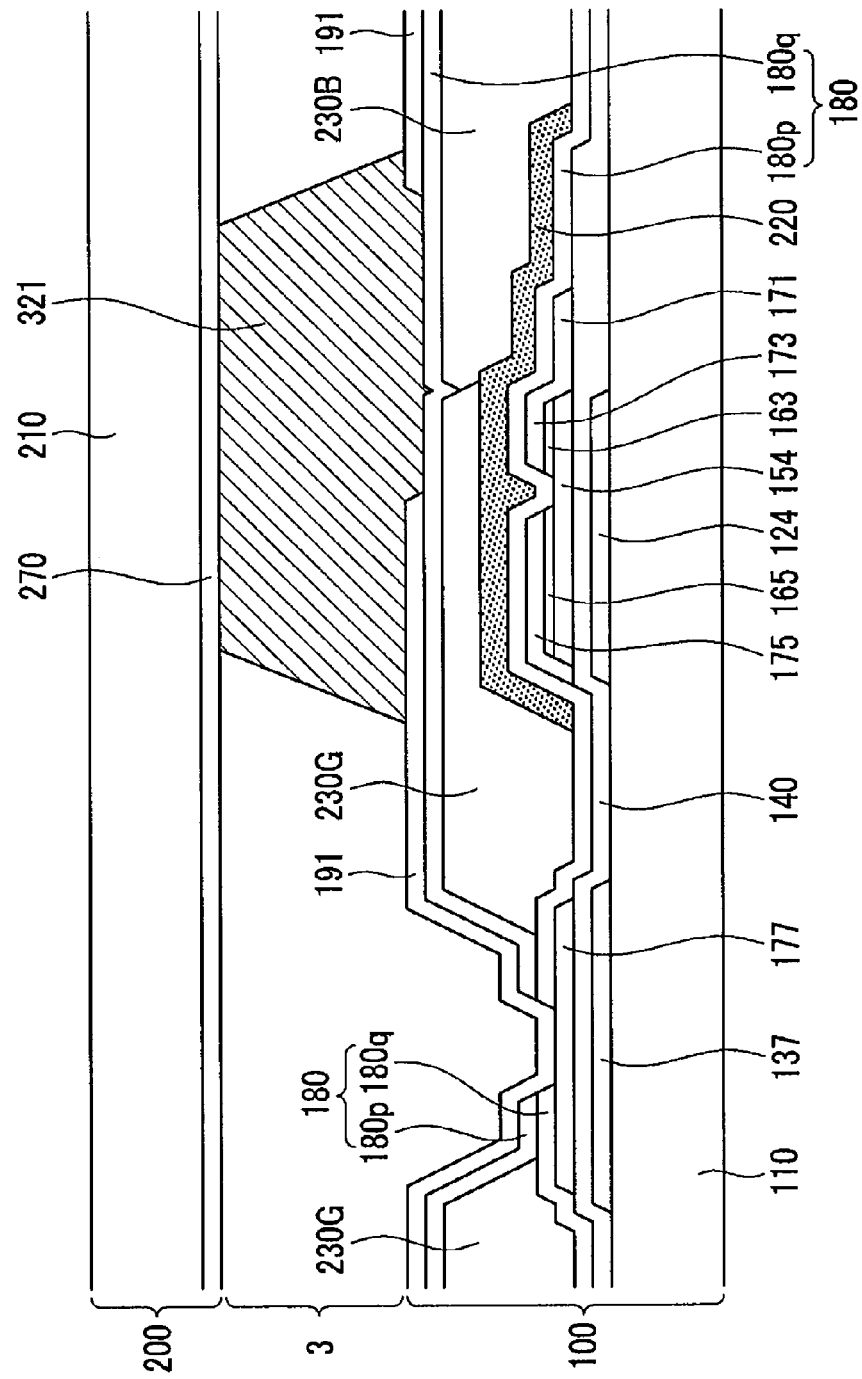
FIG. 4 is a cross-sectional view of the liquid crystal display shown in FIG. 1 taken along the IV-IV line thereof.

FIG. 1 is a layout view of a liquid crystal display according to an exemplary embodiment of the present invention, FIG. 2 is a cross-sectional view of the liquid crystal display shown in FIG. 1 taken along the line II-II, FIG. 3 is a cross-sectional view of the liquid crystal display shown in FIG. 1 taken along the line III-III, and FIG. 4 is a cross-sectional view of the liquid crystal display shown in FIG. 1 taken along the line IV-IV.

Referring to FIG. 1 to FIG. 4, a liquid crystal display according to an exemplary embodiment of the present invention includes first and second display panels 100 and 200, and a liquid crystal layer 3 interposed between the two display panels 100 and 200.

The liquid crystal layer 3 may have a positive (+) or negative (−) dielectric anisotropy. In the absence of electric field, liquid crystal molecules of the liquid crystal layer 3 may be aligned such that their directors stand substantially horizontally or vertically with respect to the surface of the two display panels 100 and 200.

Alignment layers (not shown) may be disposed on the inner surfaces of the display panels 100 and 200. The alignment layers may be horizontal alignment layers. Polarizers (not shown) may be attached to the outer surfaces of the display panels 100 and 200.

The first display panel 100 will be firstly described in detail.

The first display panel 100 may include thin film transistors disposed on the inner surface of a substrate 110.

Gate lines 121 and storage electrode lines 131 are disposed on the insulation substrate 110 that is based on transparent glass or plastic.

The gate lines 121 proceed substantially in the horizontal direction to carry gate signals. The respective gate lines 121 have a plurality of gate electrodes 124 protruding upwards ("upwards" in reference to FIG. 1).

Each storage electrode line 131 receives a predetermined voltage, and proceeds substantially parallel to a gate line 121. The storage electrode line 131 is placed adjacent to the lower side gate line 121. The storage electrode line 131 includes storage electrodes 137 with a substantially square shape, which are primary storage electrodes, and first to third shield electrodes 133a, 133b, and 133c, which are secondary storage electrodes. The shape and disposition of the storage electrode line 131 may be altered in various manners.

The first and third shield electrodes 133a and 133c are respectively disposed under a data line 171 substantially parallel thereto. The bottom end of the first shield electrode 133a and the top end of the third shield electrode 133c are connected to each other by way of the second shield electrode 133b. The connection angle of the second shield electrode 133b to the first and third shield electrodes 133a and 133c may be about 30 degrees to about 150 degrees. When the connection angle is less than about 30 degrees, a problem may be caused in the pattern formation at the bend. By contrast, when the connection angle exceeds 150 degrees, the capacitance of the shield electrodes 133a, 133b, and 133c is likely to be reduced.

The connection angle may be a right angle or an obtuse angle. With such a structure of the shield electrodes 133a, 133b, and 133c, the aperture ratio is increased while the RGB gamma distortions are reduced, and a short between the shield electrodes is prevented.

In a liquid crystal display where the first and third shield electrodes 133a and 133c face each other while extending parallel to the data line on each side of the data line, the distance between the shield electrodes becomes small. This small separation distance between the shield electrodes undesirably decreases the reduction in aperture ratio so that a short may occur between the shield electrodes in case of a patterning error or a foreign material. The practical distance between the shield electrodes is established to be about 4 µm based on after cleaning inspection (ACI), and about 2.5 µm based on after development inspection (ADI). The structure according to an exemplary embodiment of the present invention eliminates the first and third shield electrodes 133a and 133c facing each other, and hence reduces the possibility of a short between the shield electrodes.

The first to third shield electrodes 133a, 133b, and 133c may have a width of about 3 µm to about 4 µm. Embodiments of the invention are not limited to the first to third shield electrodes 133a, 133b, and 133c having the same width. Unless the aperture ratio is reduced, the width of the first and third shield electrodes 133a and 133c may be enlarged to about 4 µm, while the width of the second shield electrode 133b may be narrowed to about 3 µm (See FIG. 7).

The length ratio of the first shield electrode 133a to the third shield electrode 133c may be about 1:2 to about 2:1. FIG. 1 illustrates the case where the length ratio of the first shield electrode 133a to the third shield electrode 133c is about 1:1. When the length of the first shield electrode 133a is the same as that of the third shield electrode 133c, couplings at both left and right sides of the pixel is maintained equally, and the RGB gamma distortions and the waterfall effect is reduced. Although it is preferable to make the length ratio of the first shield electrode 133a to the third shield electrode 133c about 1:1, the gamma distortions and the waterfall effect is reduced even when that length ratio is in the range of about 1:2 to about 2:1.

A gate insulating layer 140 made of silicon nitride (SiNx) or silicon oxide (SiOx) is disposed on the gate line 121 and the storage electrode line 131.

Semiconductor islands 154 are disposed on the gate insulating layer 140 with hydrogenated amorphous silicon (the amorphous silicon being abbreviated as a-Si) or polysilicon. Each semiconductor island 154 is placed on a gate electrode 124.

Ohmic contacts 163 and 165 are disposed on the semiconductor islands 154. The ohmic contacts 163 and 165 may be disposed with n+ hydrogenated amorphous silicon where n-type impurities such as phosphorus are doped at a high concentration, or of silicide.

The data lines 171 and drain electrodes 175 are disposed on the ohmic contacts 163 and 165 and the gate insulating layer 140.

The data lines 171 for carrying data voltages proceed substantially in the vertical direction such that they cross the gate lines 121. The data lines 171 are disposed substantially parallel to the first and third shield electrodes 133a and 133c, and are positioned close to the gate electrodes 124. The data lines 171 include source electrodes 173 connected thereto on the gate electrodes 124. In the present exemplary embodiment, the source electrodes 173 are disposed in the shape of a horizontally laid capital U, but this structure may be altered in various manners.

Each drain electrode 175 is spaced apart from a source electrode 173 by a distance, and has a narrow portion and a wide portion 177. The narrow portion of the drain electrode 175 has an end that is partially surrounded by the source electrode 173, and the wide portion 177 of the drain electrode 175 is substantially square-shaped while being overlapped with the storage electrode 137. The wide portion 177 of the drain electrode 175 occupies substantially the same area as that of the storage electrode 137, but is not outside the boundaries of the storage electrode 137 in plan view.

The gate electrode 124, the source electrode 173, and the drain electrode 175 form a thin film transistor (TFT) in association with the semiconductor 154. The channel of the thin film transistor is disposed at the semiconductor 154 between the source and drain electrodes 173 and 175.

The ohmic contacts 163 and 165 exist only between the underlying semiconductors 154 and the overlying data lines 171 and drain electrodes 175 so as to lower the contact resistance therebetween. Each semiconductor 154 has exposed portions not covered by the data line 171 and the drain electrode 175, including a portion between the source and drain electrodes 173 and 175.

A passivation layer 180 is disposed on the data lines 171, the drain electrodes 175, and the exposed portions of the semiconductors 154. The passivation layer 180 includes lower and upper layers 180p and 180q based on an inorganic insulator such as silicon nitride and silicon oxide. One of the lower and upper layers 180p and 180q may be omitted. The lower layer 180p may be an organic insulating layer.

Contact holes 185 are disposed at the passivation layer 180 such that they expose the wide portions 177 of the drain electrodes 175.

A light blocking member 220, called the black matrix, is disposed on the lower layer 180p. When the width of the light blocking member 220 is about 13 µm or less, the aperture ratio is increased, while the RGB gamma distortions and the power consumption are reduced.

Red, green, and, blue color filters 230R, 230G, and 230B are disposed on the lower layer 180p or the light blocking member 220. The color filters 230R, 230G, and 230B occupy regions between neighboring data lines 171. The left and right boundaries of the color filters 230R, 230G, and 230B are placed over the data lines 171, and may vertically extend along the data lines 171 (see FIG. 1). In the latter case, the color filters 230R, 230G, and 230B may be disposed as stripes.

Openings 235 are disposed at the color filters 230R, 230G, and 230B over the wide portions 177 of the drain electrodes 175. Each opening 235 occupies substantially the same area as that of a wide portion 177 of a drain electrode 175, but does not extend outside the boundaries of the wide portion 177 in plan view. The outline of the contact hole 185 is lies within the boundaries of the opening 235 in plan view.

The color filters 230R, 230G, and 230B may be disposed with a photosensitive organic material containing a pigment.

Pixel electrodes 191 and contact assistants 81 and 82 are disposed on the upper layer 180q of the passivation layer 180. The pixel electrodes 191 and the contact assistants 81 and 82 may be disposed with a transparent conductive material such as ITO and IZO, or a reflective metal such as aluminum, silver, chromium, and alloys thereof.

The contact assistants 81 and 82 are connected to ends 129 of the gate lines 121 and ends 179 of the data lines 171 through contact holes 181 and 182, respectively. The contact assistants 81 and 82 assist the adhesion of the ends 129 of the gate lines 121 and the ends 179 of the data lines 171 to external devices, and protect them.

The pixel electrode 191 is connected to the drain electrode 175 of the thin film transistor through the contact hole 185 to receive a data voltage from the drain electrode 175. The pixel electrode 191 receiving a data voltage generates an electric field in association with a common electrode 270 of the second display panel 200 so as to determine the direction of liquid crystal molecules of the liquid crystal layer 3 between the two electrodes 191 and 270. The luminance of the light passing through the liquid crystal layer 3 is differentiated depending upon the determined direction of the liquid crystal molecules.

The pixel electrode 191 and the common electrode 270 form a liquid crystal capacitor that maintains the applied voltage even after the thin film transistor turns off.

The pixel electrode 191 and the drain electrode 175 connected thereto overlap the storage electrode line 131 including the storage electrode 137 and the shield electrodes 133a, 133b, and 133c to thereby form a storage capacitor.

A colored subsidiary light blocking member 320 is disposed between the neighboring pixel electrodes 191. The subsidiary light blocking member 320 covers all the space between the neighboring pixel electrodes 191, and contacts the upper layer 180q, or the color filter 230R or 230G. Accordingly, even if the light blocking member 220 is misaligned after being horizontally moved left or right by about 3 µm or more, the colored subsidiary light blocking member 320 covers the gap between the neighboring pixel electrodes 191 to prevent light leakage at that gap.

The thickness of the subsidiary light blocking member 320 is established to be about 2 µm or less so as to prevent the light leakage possibly generated due to abnormal alignment of the liquid crystal molecules as the height of the light blocking member 320 increases. The distance between the neighboring pixel electrodes 191 is established to be about 6 µm, and the width of the subsidiary light blocking member 320 is preferably established to be about 6 µm or more because it covers all the space between the neighboring pixel electrodes 191. However, if the width of the subsidiary light blocking member 320 exceeds about 13 µm, the aperture ratio is reduced. For this reason, the width of the subsidiary light blocking member 320 is preferably established to be about 13 µm or less.

The colored subsidiary light blocking member 320 includes an organic material. The subsidiary light blocking member 320 may include a column spacer 321 (see FIG. 4). The column spacer 321 maintains a constant thickness for the liquid crystal layer 3. The column spacer 321 is thicker than the subsidiary light blocking member 320. A half-tone mask may be used to form the column spacer 321 and the subsidiary light blocking member 320 that differ in thickness from each other, by way of engraving either in intaglio or in relief.

The second display panel 200 will now be described in detail.

With the second display panel 200, an overcoat (not shown) is disposed on an insulation substrate 210 based on transparent glass or plastic. The overcoat is disposed with an organic or inorganic insulating material. The overcoat may be omitted.

A common electrode 270 is disposed on the overcoat. The common electrode 270 is disposed with a transparent conductor such as ITO and IZO, and receives a common voltage.

An alignment layer (not shown) may be disposed on the common electrode 270. In this case, the alignment layer contacts the first display panel 100.

Figure 5:
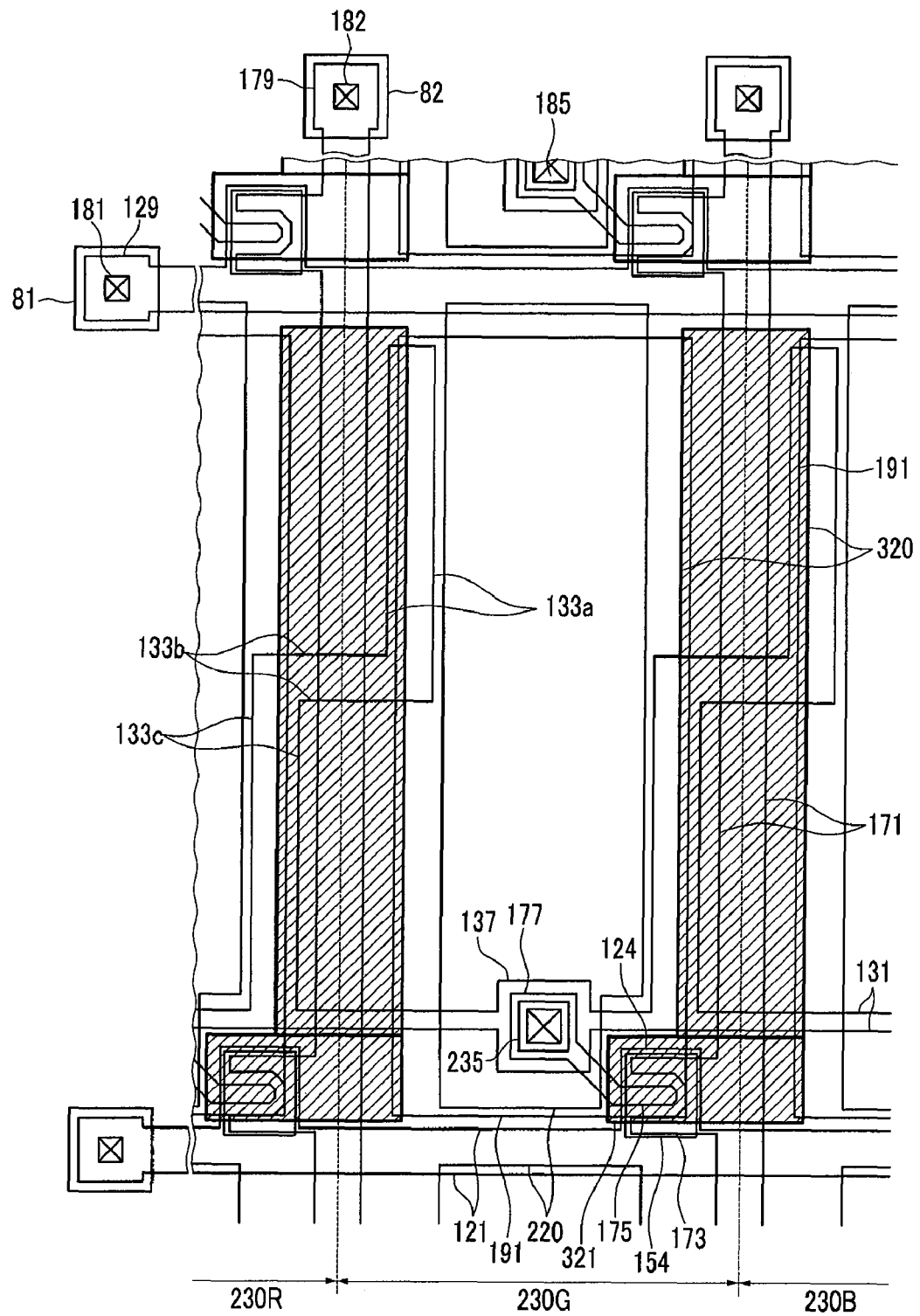
FIG. 5 is a layout view of a liquid crystal display according to an exemplary embodiment of the present invention.

FIG. 5 is a layout view of a liquid crystal display according to an exemplary embodiment of the present invention. The liquid crystal display shown in FIG. 5 is similar in structure to that described with reference to FIG. 1, except that the first shield electrode 133a is on the right side of the data line 171 and the third shield electrode 133c on the left side of the data line 171.

Figure 6:
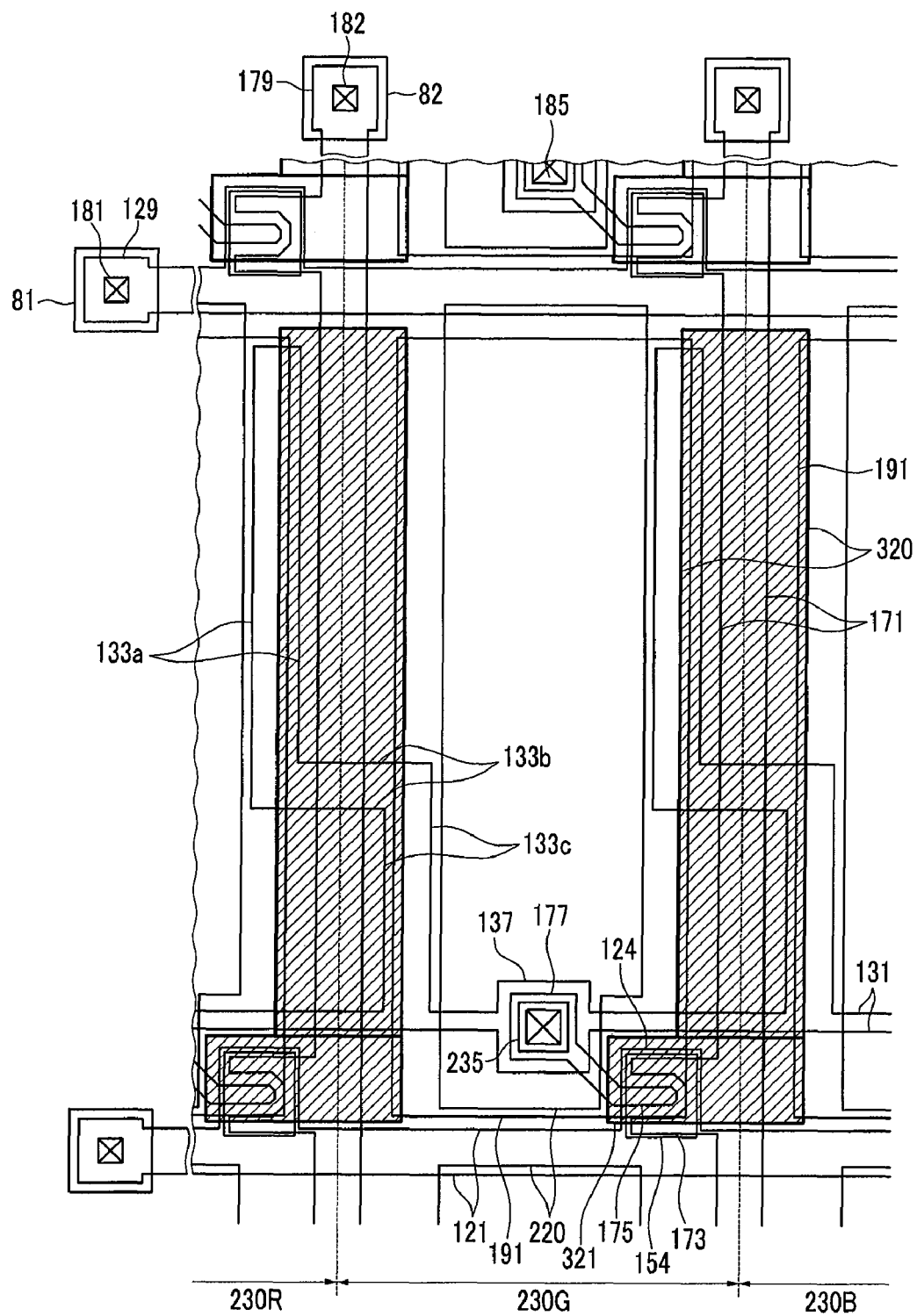
FIG. 6 is a layout view of a liquid crystal display according to an exemplary embodiment of the present invention.

FIG. 6 is a layout view of a liquid crystal display according to an exemplary embodiment of the present invention. The liquid crystal display shown in FIG. 6 is similar in structure to that described with reference to FIG. 1, except that the length ratio of the first shield electrode 133a to the third shield electrode 133c is 2:1.

Figure 7:
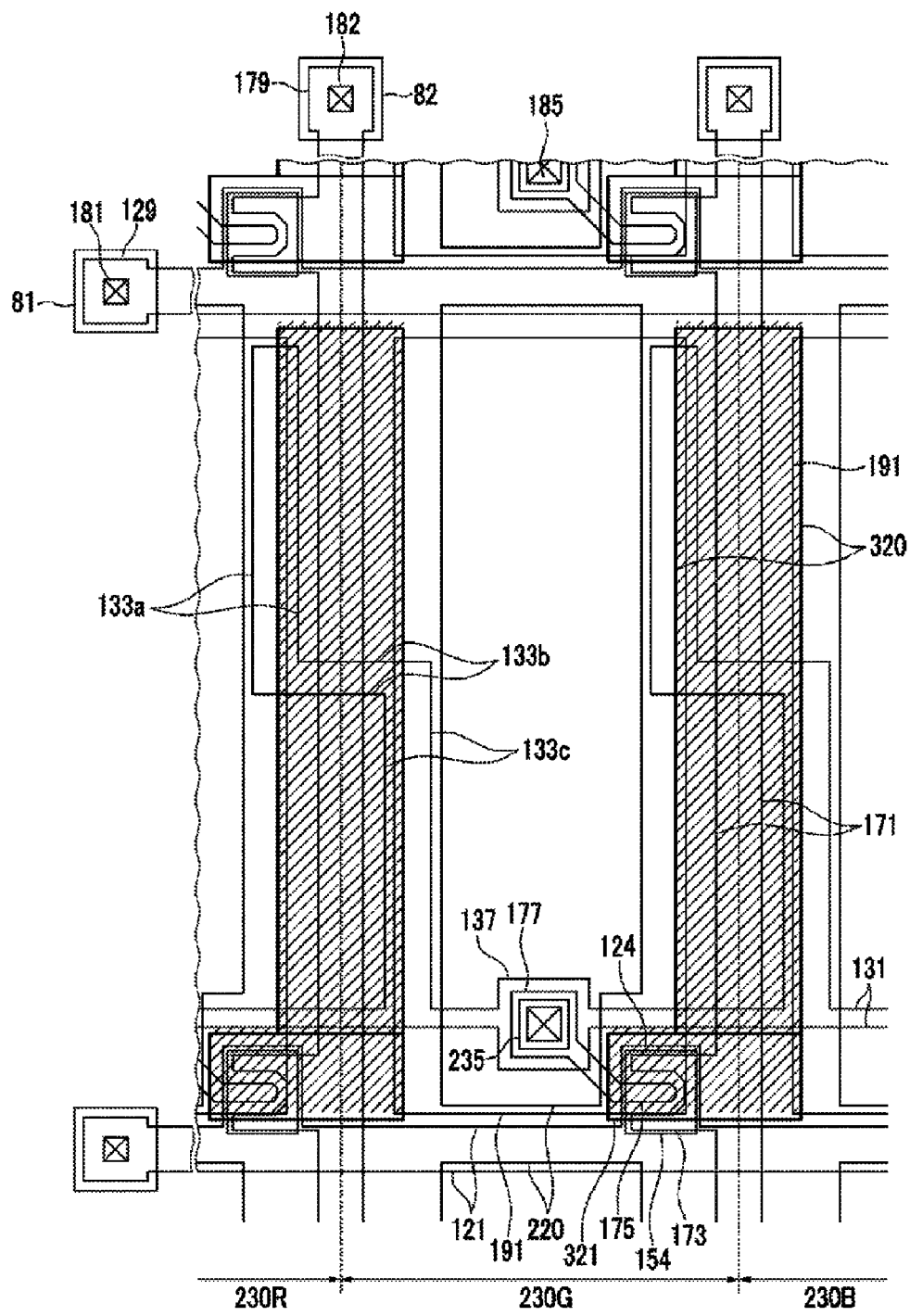
FIG. 7 is a layout view of a liquid crystal display of a further embodiment similar to that of FIG. 1.

FIG. 7 is a layout view of a liquid crystal display according to an exemplary embodiment of the present invention. The liquid crystal display shown in FIG. 7 is similar in structure to that described with reference to FIG. 1, except that the second shield electrode 133b is narrower than the first and the third shield electrode 133a and 133c.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
    a first display panel comprising a first substrate, a light blocking member disposed on the first substrate, a plurality of color filters disposed on the light blocking member, a plurality of pixel electrodes disposed on the plurality of color filters, and a subsidiary light blocking member disposed on the pixel electrodes while placed at the region between the neighboring pixel electrodes, wherein the subsidiary light blocking member substantially completely overlaps the light blocking member;
    a second display panel comprising a second substrate facing the first substrate, and a common electrode disposed on the second substrate; and
    a liquid crystal layer disposed between the first and second display panels.

2. The liquid crystal display of claim 1, wherein the subsidiary light blocking member has a width of about 6µm to about 13µm.

3. The liquid crystal display of claim 2 further comprising a column spacer disposed on the pixel electrode, wherein the column spacer comprises the same material as the subsidiary light blocking member.

4. The liquid crystal display of claim 2, wherein the subsidiary light blocking member has a thickness of less than about 2µm.

5. The liquid crystal display of claim 4, wherein the first display panel further comprises:
    a gate line and a storage electrode line disposed on the first substrate;
    a data line crossing the gate line and the storage electrode line while being insulated from the gate line and the storage electrode, the data line overlapping the light blocking member;
    a thin film transistor comprising a gate electrode connected to the gate line, a source electrode connected to the data line, and a drain electrode connected to the pixel electrode;
    a storage electrode connected to the storage electrode line, the storage electrode overlapping the drain electrode;
    a first shield electrode disposed parallel to the data line, the first shield electrode connected to the storage electrode line;
    a third shield electrode disposed parallel to the data line and across the data line from the first shield electrode; and
    a second shield electrode connecting the bottom end of the first shield electrode with the top end of the third shield electrode.

6. The liquid crystal display of claim 5, wherein the second shield electrode is connected to the first and third shield electrodes at an angle of about 30 degrees to about 150 degrees.

7. The liquid crystal display of claim 5, wherein the length ratio of the first shield electrode to the third shield electrode is about 1:2 to about 2:1.

8. The liquid crystal display of claim 1, wherein the first display panel further comprises:
    a gate line and a storage electrode line disposed on the first substrate;
    a data line crossing the gate line and the storage electrode line while being insulated from the data line and the storage electrode line, the data line overlapping the light blocking member;
    a thin film transistor comprising a gate electrode connected to the gate line, a source electrode connected to the data line, and a drain electrode connected to the pixel electrode;
    a storage electrode connected to the storage electrode line, the storage electrode overlapping the drain electrode;
    a first shield electrode disposed parallel to the data line, the first shield electrode connected to the storage electrode line;

a third shield electrode disposed parallel to the data line and across the data line from the first shield electrode; and a second shield electrode connecting the bottom end of the first shield electrode with the top end of the third shield electrode.

9. The liquid crystal display of claim 8, wherein the second shield electrode is connected to the first and third shield electrodes at an angle of about 30 degrees to 150 degrees.

10. The liquid crystal display of claim 8, wherein the length ratio of the first shield electrode to the third shield electrode is about 1:2 to about 2:1.

11. The liquid crystal display of claim 8, wherein each of the first to third shield electrodes has a width of about 3μm to about 4μm.

12. The liquid crystal display of claim 11, wherein the second shield electrode is narrower than the first and third shield electrodes.

* * * * *